(12) United States Patent
Kanemoto et al.

(10) Patent No.: US 9,876,710 B2
(45) Date of Patent: Jan. 23, 2018

(54) COMMUNICATION DEVICE, COMMUNICATION SYSTEM, AND COMMUNICATION METHOD

(71) Applicant: FUJITSU LIMITED, Kawasaki-shi, Kanagawa (JP)

(72) Inventors: Tatsushi Kanemoto, Hiroshima (JP); Tatsuya Kawasaki, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/684,474

(22) Filed: Apr. 13, 2015

(65) Prior Publication Data

US 2015/0350065 A1 Dec. 3, 2015

(30) Foreign Application Priority Data

May 30, 2014 (JP) ................................. 2014-113416

(51) Int. Cl.
*H04J 1/16* (2006.01)
*H04L 12/707* (2013.01)
(Continued)

(52) U.S. Cl.
CPC .............. *H04L 45/24* (2013.01); *H04L 45/38* (2013.01); *H04L 47/125* (2013.01)

(58) Field of Classification Search
CPC ............. H04L 45/28; H04L 2012/5627; H04L 41/0668; H04L 1/22; H04L 47/10;
(Continued)

(56) References Cited

U.S. PATENT DOCUMENTS 6,928,484 B1 * 8/2005 Huai ....................... H04L 45/12
370/238
2003/0081606 A1 5/2003 Tamura et al.
(Continued)

FOREIGN PATENT DOCUMENTS

JP 2003-143178 5/2003
JP 2004-221805 8/2004
(Continued)

OTHER PUBLICATIONS

JPOA—Office Action of Japanese Patent Application No. 2014-113416 dated Nov. 28, 2017, with machine translation.

*Primary Examiner* — Brenda H Pham
(74) *Attorney, Agent, or Firm* — Fujitsu Patent Center

(57) ABSTRACT

An RB includes a grouping unit that groups VLANs in a TRILL network into patterns by using the low 3 bit sequence of a VLANID; a calculating unit that calculates the number of redundant paths with equal costs among physical paths in the TRILL network; and a sorting unit that sorts the patterns of VLANs, which are to be assigned to the physical paths, into the groups that are equivalent to the number of redundant paths according to a predetermined order. The RB includes an assignment table for managing, with respect to each of the groups, an assignable output destination path among the physical paths. The RB includes a control unit that refers to the assignment table, determines the output destination path for each of the groups, and collectively assigns all the VLANs of all the patterns of an appropriate group to the output destination path of the group.

9 Claims, 17 Drawing Sheets

| PATTERN (LOW 3 BITS) | VLAN (ID EXAMPLE) | GROUP NUMBER | ECMP TOWARD TERMINAL RB 3F | | | ECMP TOWARD TERMINAL RB 3A | | |
|---|---|---|---|---|---|---|---|---|
| | | | RB3A | RB3B | RB3C | RB3F | RB3E | RB3D |
| 0(000₍₂₎) | 8 | 1 | RB3B | RB3D | RB3D | RB3D | RB3B | RB3B |
| 1(001₍₂₎) | 9 | 2 | RB3C | RB3E | RB3E | RB3E | RB3C | RB3C |
| 2(010₍₂₎) | 10 | 1 | RB3B | RB3D | RB3D | RB3D | RB3B | RB3B |
| 3(011₍₂₎) | 11 | 2 | RB3C | RB3E | RB3E | RB3E | RB3C | RB3C |
| 4(100₍₂₎) | 12 | 1 | RB3B | RB3D | RB3D | RB3D | RB3B | RB3B |
| 5(101₍₂₎) | 13 | 2 | RB3C | RB3E | RB3E | RB3E | RB3C | RB3C |
| 6(110₍₂₎) | 14 | 1 | RB3B | RB3D | RB3D | RB3D | RB3B | RB3B |
| 7(111₍₂₎) | 15 | 2 | RB3C | RB3E | RB3E | RB3E | RB3C | RB3C |

(51) Int. Cl.
*H04L 12/721* (2013.01)
*H04L 12/803* (2013.01)

(58) Field of Classification Search
CPC ......... H04L 47/30; H04L 47/11; H04L 47/12; H04L 12/5602; H04L 47/27
USPC ....... 370/219, 220, 229, 231, 235, 238, 237, 370/248, 252, 389
See application file for complete search history.

(56) References Cited

U.S. PATENT DOCUMENTS

| | | | |
|---|---|---|---|
| 2004/0032868 A1* | 2/2004 | Oda | H04L 12/4641 370/389 |
| 2004/0136368 A1 | 7/2004 | Wakayama et al. | |
| 2007/0280104 A1 | 12/2007 | Miyoshi et al. | |

FOREIGN PATENT DOCUMENTS

| | | |
|---|---|---|
| JP | 2007-325271 A | 12/2007 |
| JP | 2012-124775 A | 6/2012 |
| WO | 2014052395 A1 | 4/2014 |

* cited by examiner

| VLAN (dec) | VLAN (bin) | | | | | | | | | LOW 3 BITS | | | PATTERN |
|---|---|---|---|---|---|---|---|---|---|---|---|---|---|
| 1 | 0 | 0 | 0 | 0 | 0 | 0 | 0 | 0 | 0 | 0 | 0 | 1 | 001 |
| 2 | 0 | 0 | 0 | 0 | 0 | 0 | 0 | 0 | 0 | 0 | 1 | 0 | 010 |
| 3 | 0 | 0 | 0 | 0 | 0 | 0 | 0 | 0 | 0 | 0 | 1 | 1 | 011 |
| 4 | 0 | 0 | 0 | 0 | 0 | 0 | 0 | 0 | 0 | 1 | 0 | 0 | 100 |
| 5 | 0 | 0 | 0 | 0 | 0 | 0 | 0 | 0 | 0 | 1 | 0 | 1 | 101 |
| 6 | 0 | 0 | 0 | 0 | 0 | 0 | 0 | 0 | 0 | 1 | 1 | 0 | 110 |
| 7 | 0 | 0 | 0 | 0 | 0 | 0 | 0 | 0 | 0 | 0 | 1 | 1 | 111 |
| 8 | 0 | 0 | 0 | 0 | 0 | 0 | 0 | 0 | 0 | 0 | 0 | 0 | 000 |
| 9 | 0 | 0 | 0 | 0 | 0 | 0 | 0 | 0 | 0 | 0 | 0 | 1 | 001 |
| ⋮ | | | | | | | | | | | | | ⋮ |
| 4093 | 1 | 1 | 1 | 1 | 1 | 1 | 1 | 1 | 1 | 1 | 0 | 1 | 101 |
| 4094 | 1 | 1 | 1 | 1 | 1 | 1 | 1 | 1 | 1 | 1 | 1 | 0 | 110 |

FIG.6A 73A (73)

| PATTERN | ECMP NUMBER | | | | | | | |
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 1 | 1 | 1 | 1 | 1 | 1 | 1 |
| 010 | 3 | 2 | 2 | 2 | 2 | 1 | 1 | 1 |
| 011 | 4 | 3 | 2 | 2 | 2 | 2 | 1 | 1 |
| 100 | 5 | 4 | 3 | 3 | 3 | 2 | 2 | 1 |
| 101 | 6 | 5 | 4 | 3 | 3 | 2 | 2 | 1 |
| 110 | 7 | 6 | 5 | 4 | 4 | 3 | 2 | 1 |
| 111 | 8 | 7 | 6 | 5 | 4 | 3 | 2 | 1 |

FIG.6B 74A (74)

| PATTERN (LOW 3 BITS) | VLAN (ID EXAMPLE) | GROUP NUMBER | ECMP TOWARD TERMINAL RB 3F | | | ECMP TOWARD TERMINAL RB 3A | | |
|---|---|---|---|---|---|---|---|---|
| | | | RB3A | RB3B | RB3C | RB3F | RB3E | RB3D |
| 0 (000$_{(2)}$) | 8 | 1 | RB3B | RB3D | RB3D | RB3D | RB3B | RB3B |
| 1 (001$_{(2)}$) | 9 | | | | | | | |
| 2 (010$_{(2)}$) | 10 | | | | | | | |
| 3 (011$_{(2)}$) | 11 | | | | | | | |
| 4 (100$_{(2)}$) | 12 | 2 | RB3C | RB3E | RB3E | RB3E | RB3C | RB3C |
| 5 (101$_{(2)}$) | 13 | | | | | | | |
| 6 (110$_{(2)}$) | 14 | | | | | | | |
| 7 (111$_{(2)}$) | 15 | | | | | | | |

FIG.8A 73B (73)

| PATTERN | ECMP NUMBER ||||||||
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 2 | 2 | 2 | 2 | 2 | 2 | 1 |
| 010 | 3 | 3 | 3 | 3 | 3 | 3 | 1 | 1 |
| 011 | 4 | 4 | 4 | 4 | 4 | 1 | 2 | 1 |
| 100 | 5 | 5 | 5 | 5 | 1 | 2 | 1 | 1 |
| 101 | 6 | 6 | 6 | 1 | 2 | 3 | 2 | 1 |
| 110 | 7 | 7 | 1 | 2 | 3 | 1 | 1 | 1 |
| 111 | 8 | 1 | 2 | 3 | 4 | 2 | 2 | 1 |

FIG.8B 74B (74)

| PATTERN (LOW 3 BITS) | VLAN (ID EXAMPLE) | GROUP NUMBER | ECMP TOWARD TERMINAL RB 3F ||| ECMP TOWARD TERMINAL RB 3A |||
|---|---|---|---|---|---|---|---|---|
| | | | RB3A | RB3B | RB3C | RB3F | RB3E | RB3D |
| 0(000$_{(2)}$) | 8 | 1 | RB3B | RB3D | RB3D | RB3D | RB3B | RB3B |
| 1(001$_{(2)}$) | 9 | 2 | RB3C | RB3E | RB3E | RB3E | RB3C | RB3C |
| 2(010$_{(2)}$) | 10 | 1 | RB3B | RB3D | RB3D | RB3D | RB3B | RB3B |
| 3(011$_{(2)}$) | 11 | 2 | RB3C | RB3E | RB3E | RB3E | RB3C | RB3C |
| 4(100$_{(2)}$) | 12 | 1 | RB3B | RB3D | RB3D | RB3D | RB3B | RB3B |
| 5(101$_{(2)}$) | 13 | 2 | RB3C | RB3E | RB3E | RB3E | RB3C | RB3C |
| 6(110$_{(2)}$) | 14 | 1 | RB3B | RB3D | RB3D | RB3D | RB3B | RB3B |
| 7(111$_{(2)}$) | 15 | 2 | RB3C | RB3E | RB3E | RB3E | RB3C | RB3C |

FIG.11A 73A (73)

| PATTERN | ECMP NUMBER | | | | | | | |
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 1 | 1 | 1 | 1 | 1 | 1 | 1 |
| 010 | 3 | 2 | 2 | 2 | 2 | 1 | 1 | 1 |
| 011 | 4 | 3 | 2 | 2 | 2 | 2 | 1 | 1 |
| 100 | 5 | 4 | 3 | 3 | 3 | 2 | 2 | 1 |
| 101 | 6 | 5 | 4 | 3 | 3 | 2 | 2 | 1 |
| 110 | 7 | 6 | 5 | 4 | 4 | 3 | 2 | 1 |
| 111 | 8 | 7 | 6 | 5 | 4 | 3 | 2 | 1 |

FIG.11B 74A (74)

| PATTERN | ECMP NUMBER "2" (GROUP NUMBER) | NEIGHBORING RB (OUTPUT DESTINATION PATH) | VLAN |
|---|---|---|---|
| 000 | 1 | RB2 | 8 |
| 001 | 1 | RB2 | 9 |
| 010 | 1 | RB2 | 10 |
| 011 | 1 | RB2 | 11 |
| 100 | 2 | RB3 | 12 |
| 101 | 2 | RB3 | 13 |
| 110 | 2 | RB3 | 14 |
| 111 | 2 | RB3 | 15 |

FIG.12A 73B (73)

| PATTERN | ECMP NUMBER ||||||||
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 2 | 2 | 2 | 2 | 2 | 2 | 1 |
| 010 | 3 | 3 | 3 | 3 | 3 | 3 | 1 | 1 |
| 011 | 4 | 4 | 4 | 4 | 4 | 1 | 2 | 1 |
| 100 | 5 | 5 | 5 | 5 | 1 | 2 | 1 | 1 |
| 101 | 6 | 6 | 6 | 1 | 2 | 3 | 2 | 1 |
| 110 | 7 | 7 | 1 | 2 | 3 | 1 | 1 | 1 |
| 111 | 8 | 1 | 2 | 3 | 4 | 2 | 2 | 1 |

FIG.12B 74B (74)

| PATTERN | ECMP NUMBER "2" (GROUP NUMBER) | NEIGHBORING RB (OUTPUT DESTINATION PATH) | VLAN |
|---|---|---|---|
| 000 | 1 | RB4 | 8 |
| 001 | 2 | RB5 | 9 |
| 010 | 1 | RB4 | 10 |
| 011 | 2 | RB5 | 11 |
| 100 | 1 | RB4 | 12 |
| 101 | 2 | RB5 | 13 |
| 110 | 1 | RB4 | 14 |
| 111 | 2 | RB5 | 15 |

FIG.13

| | COMPARATIVE EXAMPLE: NORMAL PERFORMANCE (PROCESSING TIME) | | | PERFORMANCE (PROCESSING TIME: LOW 3 BITS MASK ENTRY METHOD) WHEN THIRD EMBODIMENT IS APPLIED | | | | | | | | | | | |
|---|---|---|---|---|---|---|---|---|---|---|---|---|---|---|---|
| | | | | MIN (ECMP NUMBER 1): NO DISTRIBUTION | | | MID (ECMP NUMBER 2) | | | MID (ECMP NUMBER 4) | | | MAX (ECMP NUMBER 8) | | |
| VLAN NUMBER | SOFT-WARE PRO-CESSING | HARD-WARE PRO-CESSING | TOTAL | SOFT-WARE PRO-CESSING | HARD-WARE PRO-CESSING | TOTAL | SOFT-WARE PRO-CESSING | HARD-WARE PRO-CESSING | TOTAL | SOFT-WARE PRO-CESSING | HARD-WARE PRO-CESSING | TOTAL | SOFT-WARE PRO-CESSING | HARD-WARE PRO-CESSING | TOTAL |
| 1 | 2 ms | 20 ms | 22 ms | 2 ms | 20 ms | 22 ms | 2 ms | 20 ms | 22 ms | 2 ms | 20 ms | 22 ms | 2 ms | 20 ms | 22 ms |
| 2 | 4 ms | 40 ms | 44 ms | 2 ms | 20 ms | 22 ms | 2 TO 4 ms | 20 TO 40 ms | 22 TO 44 ms | 2 TO 4 ms | 20 TO 40 ms | 22 TO 44 ms | 2 TO 4 ms | 20 TO 40 ms | 22 TO 44 ms |
| 3 | 6 ms | 60 ms | 66 ms | 2 ms | 20 ms | 22 ms | 2 TO 4 ms | 20 TO 40 ms | 22 TO 44 ms | 2 TO 6 ms | 20 TO 60 ms | 22 TO 66 ms | 2 TO 6 ms | 20 TO 60 ms | 22 TO 66 ms |
| 4 | 8 ms | 80 ms | 88 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 8 ms | 20 TO 80 ms | 22 TO 88 ms |
| 5 | 10 ms | 100 ms | 110 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 10 ms | 20 TO 100 ms | 22 TO 110 ms |
| 6 | 12 ms | 120 ms | 132 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 12 ms | 20 TO 120 ms | 22 TO 132 ms |
| 7 | 14 ms | 140 ms | 154 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 14 ms | 20 TO 140 ms | 22 TO 154 ms |
| 8 | 16 ms | 160 ms | 176 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 16 ms | 20 TO 160 ms | 22 TO 176 ms |
| 9 | 18 ms | 180 ms | 198 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 16 ms | 20 TO 160 ms | 22 TO 176 ms |
| 10 | 20 ms | 200 ms | 220 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 16 ms | 20 TO 160 ms | 22 TO 176 ms |
| ... | | | | | | | | | | | | | | | |
| 100 | 200 ms | 2000 ms | 2200 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 16 ms | 20 TO 160 ms | 22 TO 176 ms |
| ... | | | | | | | | | | | | | | | |
| 1000 | 2000 ms | 20000 ms | 22000 ms | 2 ms | 20 ms | 22 ms | 2 TO 4 ms | 20 TO 40 ms | 22 TO 44 ms | 2 TO 8 ms | 20 TO 80 ms | 22 TO 88 ms | 2 TO 16 ms | 20 TO 160 ms | 22 TO 176 ms |
| ... | | | | | | | | | | | | | | | |
| 4096 | 8192 ms | 81920 ms | 90112 ms | 2 ms | 20 ms | 22 ms | 4 ms | 40 ms | 44 ms | 8 ms | 80 ms | 88 ms | 4 TO 16 ms | 40 TO 160 ms | 44 TO 176 ms |
| | | | | | | | | | | | | | 16 ms | 160 ms | 176 ms |

PROCESSING TIME IS DIFFERENT DEPENDING ON LOW 3 BITS PATTERN OF SET VLAN ID (ALWAYS EFFECTIVE)

PROCESSING TIME IS DIFFERENT DEPENDING ON LOW 3 BITS PATTERN OF SET VLAN ID (EFFECTIVE DEPENDING ON CONDITION)

FIG.16

| VLAN | USED BAND | PATTERN |
|---|---|---|
| 8 | 0.01 Gbps | (000) |
| 9 | 0.03 Gbps | (001) |
| 10 | 0.3 Gbps | (010) |
| 11 | 0.2 Gbps | (011) |
| 24 | 0.09 Gbps | (000) |
| 25 | 0.07 Gbps | (001) |
| 26 | 0.1 Gbps | (010) |
| 27 | 0.4 Gbps | (011) |

| PATTERN | USED BAND | CALCULUS EQUATION |
|---|---|---|
| (000) | 0.1 Gbps | (0.01+0.09) |
| (001) | 0.1 Gbps | (0.03+0.07) |
| (010) | 0.4 Gbps | (0.3+0.1) |
| (011) | 0.6 Gbps | (0.2+0.4) |

FIG.18A

| VLAN (dec) | VLAN (bin) | | | | | | | | | | | | PATTERN |
|---|---|---|---|---|---|---|---|---|---|---|---|---|---|
| 1 | 0 | 0 | 0 | 0 | 0 | 0 | 0 | 0 | 0 | 0 | 0 | 1 | 0 0 0 |
| 2 | 0 | 0 | 0 | 0 | 0 | 0 | 0 | 0 | 0 | 0 | 1 | 0 | 0 0 0 |
| 3 | 0 | 0 | 0 | 0 | 0 | 0 | 0 | 0 | 0 | 0 | 1 | 1 | 0 0 0 |
| 4 | 0 | 0 | 0 | 0 | 0 | 0 | 0 | 0 | 0 | 1 | 0 | 0 | 0 0 0 |
| 5 | 0 | 0 | 0 | 0 | 0 | 0 | 0 | 0 | 0 | 1 | 0 | 1 | 0 0 0 |
| 6 | 0 | 0 | 0 | 0 | 0 | 0 | 0 | 0 | 0 | 1 | 1 | 0 | 0 0 0 |
| 7 | 0 | 0 | 0 | 0 | 0 | 0 | 0 | 0 | 0 | 1 | 1 | 1 | 0 0 0 |
| 8 | 0 | 0 | 0 | 0 | 0 | 0 | 0 | 0 | 0 | 0 | 0 | 0 | 0 0 0 |
| 9 | 0 | 0 | 0 | 0 | 0 | 0 | 0 | 0 | 0 | 0 | 0 | 1 | 0 0 0 |
| ⋮ | | | | | | | | | | | | | ⋮ |
| 4093 | 1 | 1 | 1 | 1 | 1 | 1 | 1 | 1 | 1 | 1 | 0 | 1 | 1 1 1 |
| 4094 | 1 | 1 | 1 | 1 | 1 | 1 | 1 | 1 | 1 | 1 | 1 | 0 | 1 1 1 |
| 4095 | 1 | 1 | 1 | 1 | 1 | 1 | 1 | 1 | 1 | 1 | 1 | 0 | 1 1 1 |

FIG.18B

| VLAN (dec) | VLAN (bin) | | | | | | | | | | | | PATTERN |
|---|---|---|---|---|---|---|---|---|---|---|---|---|---|
| 1 | 0 | 0 | 0 | 0 | 0 | 0 | 0 | 0 | 0 | 0 | 0 | 1 | 0 0 0 0 |
| 2 | 0 | 0 | 0 | 0 | 0 | 0 | 0 | 0 | 0 | 0 | 1 | 0 | 0 0 0 1 |
| 3 | 0 | 0 | 0 | 0 | 0 | 0 | 0 | 0 | 0 | 0 | 1 | 1 | 0 0 1 0 |
| 4 | 0 | 0 | 0 | 0 | 0 | 0 | 0 | 0 | 0 | 1 | 0 | 0 | 0 0 1 1 |
| 5 | 0 | 0 | 0 | 0 | 0 | 0 | 0 | 0 | 0 | 1 | 0 | 1 | 0 1 0 0 |
| 6 | 0 | 0 | 0 | 0 | 0 | 0 | 0 | 0 | 0 | 1 | 1 | 0 | 0 1 0 1 |
| 7 | 0 | 0 | 0 | 0 | 0 | 0 | 0 | 0 | 0 | 0 | 1 | 1 | 0 1 1 1 |
| 8 | 0 | 0 | 0 | 0 | 0 | 0 | 0 | 0 | 0 | 0 | 0 | 0 | 1 0 0 0 |
| 9 | 0 | 0 | 0 | 0 | 0 | 0 | 0 | 0 | 0 | 0 | 0 | 1 | 1 0 0 1 |
| ⋮ | | | | | | | | | | | | | ⋮ |
| 4093 | 1 | 1 | 1 | 1 | 1 | 1 | 1 | 1 | 1 | 1 | 0 | 1 | 1 1 0 1 |
| 4094 | 1 | 1 | 1 | 1 | 1 | 1 | 1 | 1 | 1 | 1 | 1 | 0 | 1 1 1 0 |
| 4095 | 1 | 1 | 1 | 1 | 1 | 1 | 1 | 1 | 1 | 1 | 1 | 0 | 1 1 1 1 |

COMMUNICATION DEVICE, COMMUNICATION SYSTEM, AND COMMUNICATION METHOD

CROSS-REFERENCE TO RELATED APPLICATION

This application is based upon and claims the benefit of priority of the prior Japanese Patent Application No. 2014-113416, filed on May 30, 2014, the entire contents of which are incorporated herein by reference.

FIELD

The embodiments discussed herein are related to a communication device, a communication system, and a communication method.

BACKGROUND

In communication devices within a communication network with a typical layer-2 redundant configuration, STP (Spanning Tree Protocol) is used and, in order to prevent loops of packet forwarding, blocking ports are formed. However, in communication devices that use STP, although loops can be prevented, paths that connect to blocking ports are unusable; therefore, it is difficult to effectively use the used band.

Therefore, in recent years, TRILL (Transparent Interconnection of Lots of Links), which is a layer-2 redundancy protocol, has been standardized according to RFC6325. TRILL is the technology for redundancy of paths in a communication network, such as Ethernet (registered trademark). Furthermore, TRILL has a mechanism for preventing loops without forming blocking ports; thus, compared to STP, an effective use of the used band and high-speed path switching are possible.

TRILL is the technology that achieves redundancy and high-speed switching of paths in a communication network by applying, to a layer 2, IS-IS that is a layer-3 routing protocol. TRILL-compatible communication devices with a built-in L2SW function have a function to determine a path with the shortest distance by using the SPF (Shortest Path First) method among physical paths in a TRILL network that is made up of multiple communication devices.

Furthermore, as each communication device in a TRILL network recognizes costs of each physical path in the TRILL network, it has a function to autonomously select the least-cost path from multiple assignable redundant paths when the currently used physical path in the TRILL network becomes unusable due to a failure, or the like.

Furthermore, TRILL has the ECMP (Equal Cost Multi Path) function as a system for assigning redundant paths in a distributed manner in the unit of traffic flows when there are multiple redundant paths with equal costs between the terminal communication devices in a TRILL network. Moreover, as RFC does not define a distribution method of the ECMP function, it is possible to apply a method of assigning traffic flows to redundant paths in the unit of VLAN (Virtual Local Area Network) in terms of the layer 2.

When each communication device assigns physical paths on a per VLAN basis, it needs to perform assignment operations, such as software processing, e.g., recalculation of physical paths on a per VLAN basis, or hardware processing for an access to hardware on a per VLAN basis, and the operations are time-consuming. Furthermore, the processing time of software processing is about 2 ms; however, hardware processing corresponds to various operations, such as port settings or frame forwarding rule settings, and its processing time is about 20 ms. That is, hardware processing needs a large amount of processing time compared to software processing.

[Patent Literature 1] Japanese Laid-open Patent Publication No. 2007-325271

However, in communication devices within a TRILL network, when the number of VLANs is increased, the number of times an assignment operation is performed is increased in proportion to the number of VLANs, and its processing time becomes longer. As TRILL enables the settings of VLANs of, for example, up to 4096, each communication device needs an assignment operation 4096 times at a maximum, and the effect on the processing time is large. Furthermore, as TRILL FGL (Fine Grained Labeling) enables the settings of VLANs of, for example, up to 16 millions, it needs an assignment operation 16 million times at a maximum, and the effect on the processing time needed for the assignment operation is large. Therefore, in communication devices, for example, after a path failure is detected, a setting operation is performed on a per VLAN basis; therefore, a large amount of time is needed for path switching and re-establishment and, meanwhile, there is a possibility that communication services are interrupted.

SUMMARY

According to an aspect of the embodiments, a communication device includes a calculating unit, a sorting unit, a managing unit and a control unit. The calculating unit calculates a number of redundant paths with an equal cost among physical paths in a communication network with a layer-2 redundancy protocol. The sorting unit sorts multiple traffic flows into groups that are equivalent to the number of redundant paths according to a predetermined order, the traffic flows being to be assigned to the physical paths. The managing unit manages, with respect to each of the groups, an assignable output destination path among the physical paths. The control unit refers to the managing unit, determines the output destination path for each of the groups, and collectively assigns all traffic flows of an appropriate group to the output destination path of the group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is an explanatory diagram that illustrates an example of a sorting table of the RB according to the first embodiment;

FIG. 6B is an explanatory diagram that illustrates an example of an assignment table of the RB according to the first embodiment;

FIG. 8A is an explanatory diagram that illustrates an example of a sorting table of the RB according to the second embodiment;

FIG. 8B is an explanatory diagram that illustrates an example of an assignment table of the RB according to the second embodiment;

FIG. 11A is an explanatory diagram that illustrates an example of the sorting table on the side of the terminal RB;

FIG. 11B is an explanatory diagram that illustrates an example of the assignment table on the side of the terminal RB;

FIG. 12A is an explanatory diagram that illustrates an example of the sorting table on the side of a relay RB;

FIG. 12B is an explanatory diagram that illustrates an example of the assignment table on the side of the relay RB;

FIG. 13 is an explanatory diagram that illustrates an example of the comparison result of the processing times with regard to an assignment operation according to the third embodiment and a comparative example;

FIG. 16 is an explanatory diagram that illustrates an example of the method for adding up the used bands on a per pattern basis;

FIG. 18A is an explanatory diagram that illustrates an example of the method for grouping the patterns of VLAN IDs; and FIG. 18B is an explanatory diagram that illustrates an example of the method for grouping the patterns of VLAN IDs.

DESCRIPTION OF EMBODIMENTS

Preferred embodiments of the present invention will be explained with reference to accompanying drawings. Furthermore, the disclosed technology is not limited to each of the embodiments. Moreover, each of the following embodiments may be combined as appropriate to the extent that there is no contradiction.

[a] First Embodiment

Figure 1:
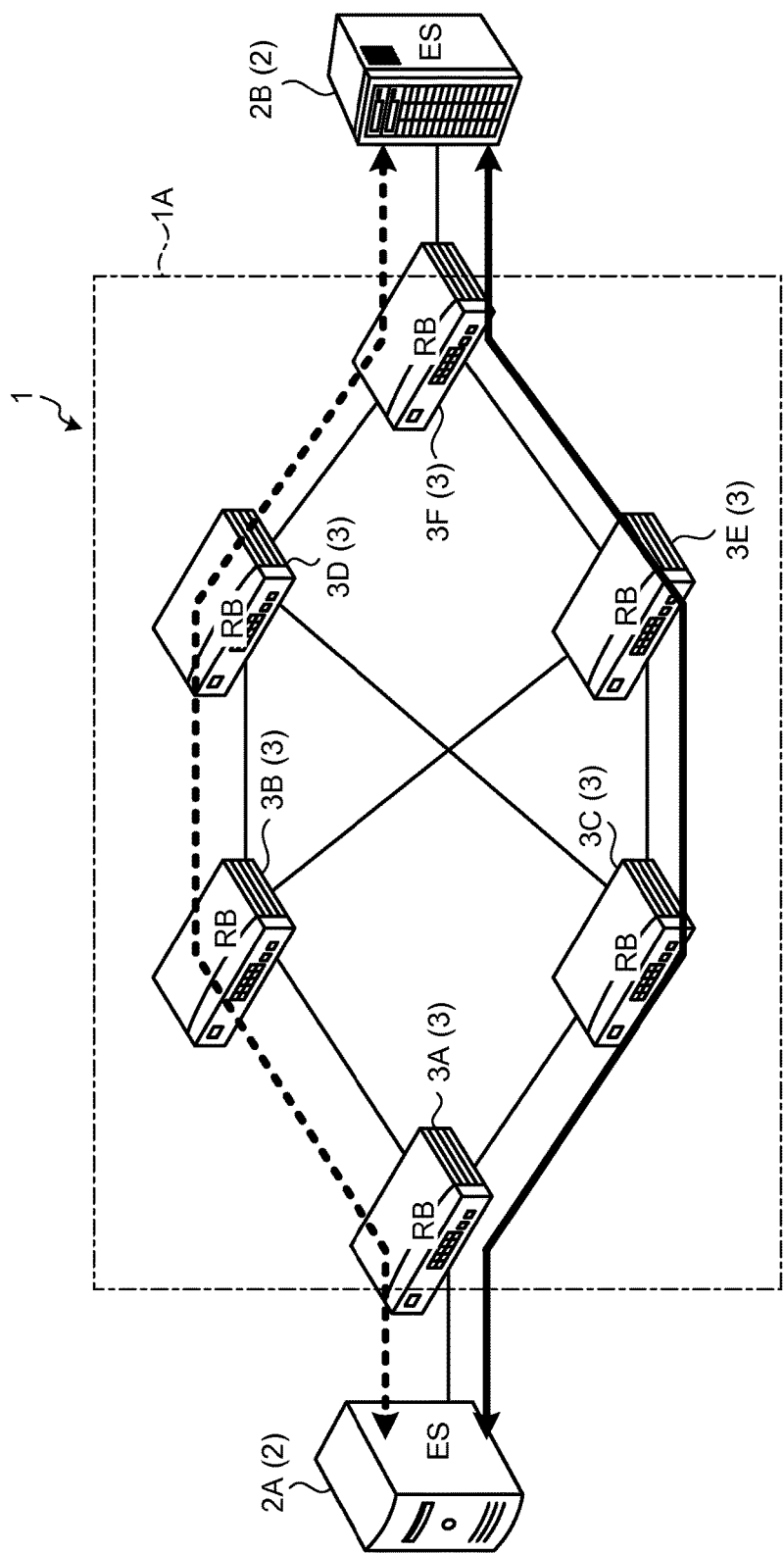
FIG. 1 is an explanatory diagram that illustrates an example of a communication system according to a first embodiment.

FIG. 1 is an explanatory diagram that illustrates an example of a communication system according to a first embodiment. A communication system 1 illustrated in FIG. 1 includes, for example, two ESs (End Stations) 2 in a communication network, such as Ethernet (registered trademark), and a TRILL network 1A that ensures a layer-2 redundant configuration between the two ESs 2. The ES 2 is a device, such as a personal computer, a server, or storage.

The TRILL network 1A includes, for example, six RBs (Routing Bridges) 3. The RB 3 is a communication device that incorporates an L2SW, or the like, in which a TRILL protocol function is implemented. The RBs 3 include two terminal RBs 3A and 3F and four relay RBs 3B, 3C, 3D, and 3E. The terminal RB 3A is located at the boundary between the TRILL network 1A and a communication network that is different from the TRILL network 1A and that contains an ES 2A, and it is an ingress terminal device on the side of the TRILL network 1A for connecting to the ES 2A. The terminal RB 3F is located at the boundary between the TRILL network 1A and a communication network that contains an ES 2B on the opposing side, and it is an egress terminal device on the side of the TRILL network 1A for connecting to the ES 2B on the opposing side.

The relay RBs 3B, 3C, 3D, and 3E are relay devices that are in the TRILL network 1A and that are present in the physical paths that are connected between the terminal RB 3A and the terminal RB 3F. The relay RBs 3B, 3C, 3D, and 3E have a function to transfer TRILL frames in the TRILL network 1A. Each of the relay RBs 3 usually has a connection topology with a redundant configuration; therefore, to distribute TRILL frames so as to prevent loads from being unevenly applied to a specific redundant path among multiple redundant paths, a control is performed to assign an output destination path. For the convenience of explanation, physical paths that connect the RBs 3 in the TRILL network 1A are lines of, for example, up to 1 Gbps.

The ES 2A illustrated in FIG. 1 is connected to the ES 2B on the opposing side via the TRILL network 1A. The ES 2A is connected to the terminal RB 3A on the side of the TRILL network 1A. The ES 2B on the opposing side is connected to the terminal RB 3F on the side of the TRILL network 1A. To forward a communication frame to the ES 2B on the opposing side, the ES 2A forwards the communication frame to the terminal RB 3A. The terminal RB 3A adds a TRILL header to a communication frame to encapsulate it and forwards the encapsulated TRILL frame to the terminal RB 3F on the opposing side via the relay RBs 3 on a physical path in the TRILL network 1A.

The terminal RB 3F on the opposing side receives the encapsulated TRILL frame, removes the TRILL header from the TRILL frame to decapsulate it, and forwards the decapsulated communication frame to the ES 2B on the opposing side. Therefore, a user on the side of the ES 2 transparently uses the TRILL network 1A without any regard to its internal configuration, and the TRILL network 1A itself becomes the image of a single logical L2SW.

Each of the RBs 3 in the TRILL network 1A exchanges a TRILL HELLO frame with the neighboring RB 3, thereby autonomously recognizing the adjacency relationship. Furthermore, each of the RBs 3 exchanges an LSP (Link State Packet) frame with the neighboring RB 3 to share the identical topology information, such as the adjacency relationship or path costs, and enable routing of a TRILL frame by using the shortest path (the lowest path cost).

Figure 2:
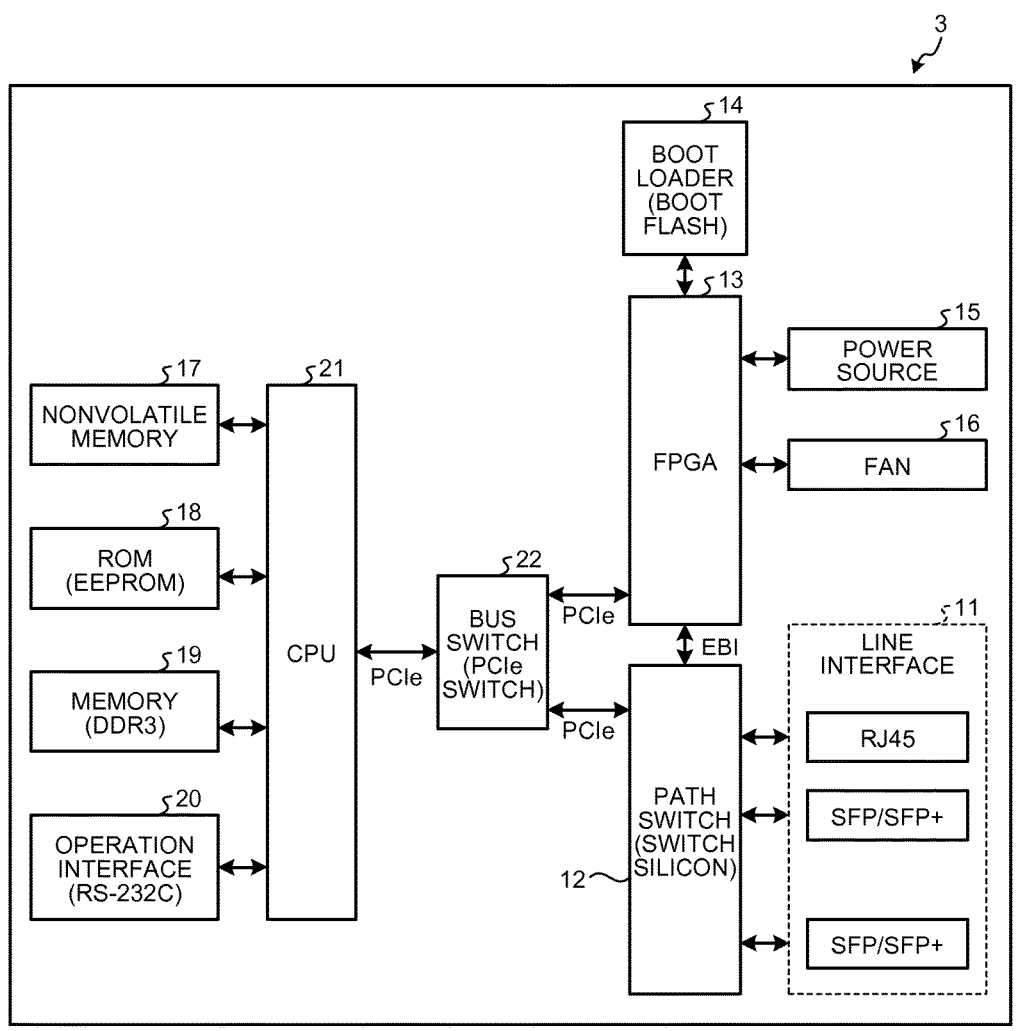
FIG. 2 is a block diagram that illustrates an example of the hardware configuration of an RB according to the first embodiment.

FIG. 2 is a block diagram that illustrates an example of the hardware configuration of the RB 3 according to the first embodiment. The RB 3 illustrated in FIG. 2 includes a line interface 11, a path switch 12, an FPGA (Field Programmable Gate Array) 13, a boot loader 14, a power source 15, and a FAN 16. The RB 3 includes a nonvolatile memory 17, a ROM (Read Only Memory) 18, a memory 19, an operation interface 20, a CPU (Central Processing Unit) 21, and a bus switch 22.

The line interface 11 is equivalent to a communication port, such as RJ45 or SFP (Small Form-Factor Pluggable), that is connected to a physical path. The path switch 12 is, for example, Switch Silicon for selecting a communication port in the line interface 11 to selectively connect a physical path that is connected to the communication port. The FPGA 13 is, for example, an integrated circuit that enables changing of the setting of configuration information. The boot loader 14 is, for example, Boot Flash for starting a changing program when a change is made to the settings of the configuration information in the FPGA 13. The power source 15 is the section for supplying electric power to the overall RB 3. The FAN 16 is an air conditioning device that cools devices inside the RB 3. The nonvolatile memory 17 is a memory area that stores various types of information, such as programs. The ROM 18 is, for example, EEPROM (Electrically Erasable Programmable Read Only Memory) that stores various types of configuration information. The memory 19 is, for example, a DDR3 (Double-Data-Rate 3) SDRAM (Synchronous Dynamic Random Access Memory) that stores various types of information, such as topology information.

The operation interface 20 is equivalent to an interface that is connected to a console terminal for changing the setting contents of the RB 3, and it is, for example, an RS-232C interface. The CPU 21 is a central processing unit that performs overall control of the RB 3. The bus switch 22 is, for example, a PCIe (Peripheral Component Interconnect-express) Switch for selectively connecting the bus line between the CPU 21 and the FPGA 13 or between the CPU 21 and the path switch 12. An EBI (External Bus Interface) connects between the FPGA 13 and the path switch 12.

Figure 3:
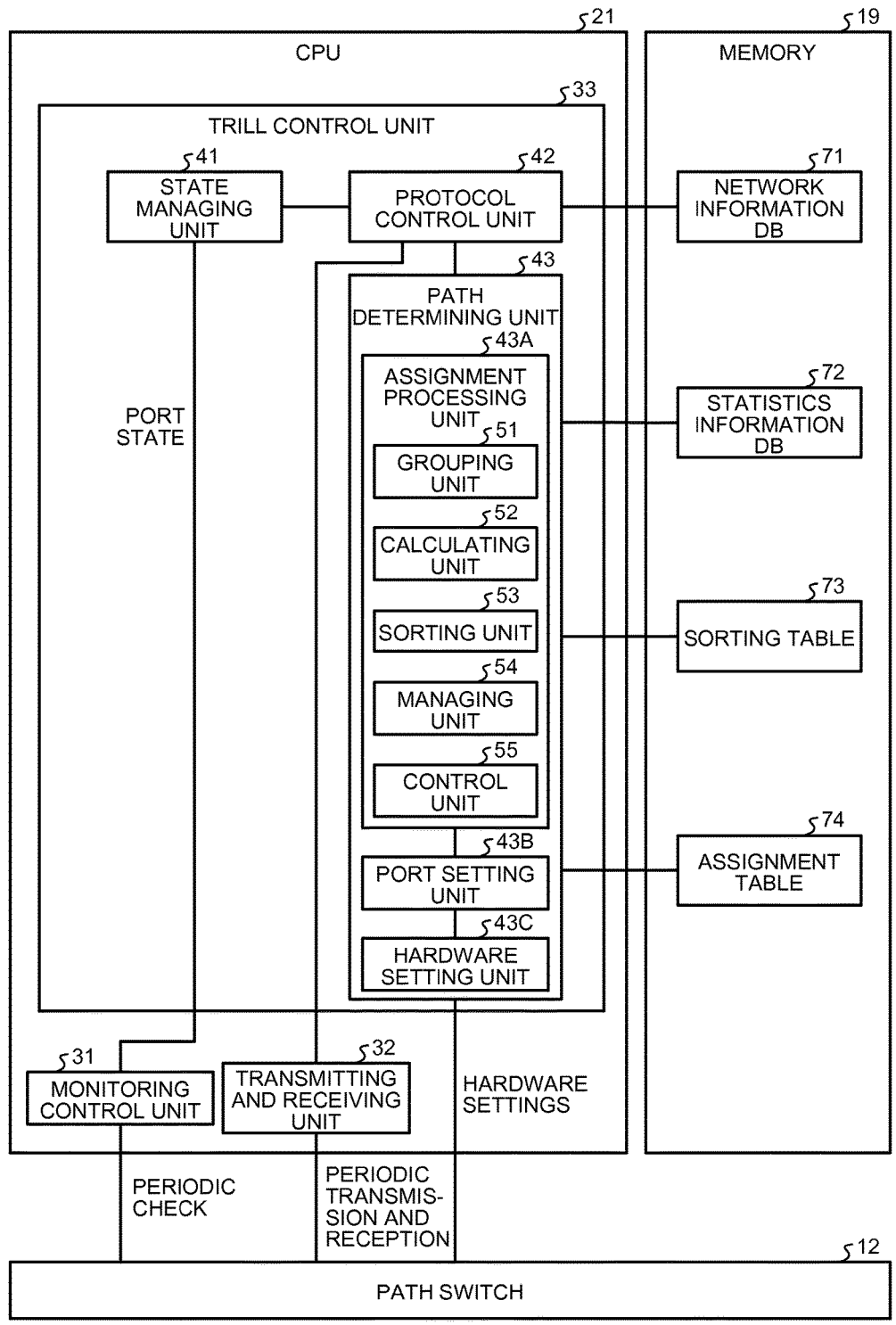
FIG. 3 is a block diagram that illustrates an example of the functional configuration of a CPU of the RB according to the first embodiment.

FIG. 3 is a block diagram that illustrates an example of the functional configuration of the CPU 21 of the RB 3 according to the first embodiment. The CPU 21 illustrated in FIG. 3 reads a communication control program that is stored in the ROM 18 and performs various processes on the basis of the communication control program as functions. The CPU 21 includes, as its functions, a monitoring control unit 31, a transmitting and receiving unit 32, and a TRILL control unit 33.

The monitoring control unit 31 monitors the state of a communication port in the line interface 11 through the path switch 12 and, when detecting a change in the state of the port, notifies the detected change to the TRILL control unit 33. Furthermore, the monitoring control unit 31 performs control to open and close a communication port in accordance with, for example, a designation from the TRILL control unit 33.

The transmitting and receiving unit 32 transmits and receives a control frame to and from the RB 3 in the TRILL network 1A through the path switch 12 and, when receiving a control frame, makes a notification to the TRILL control unit 33 and transmits a control frame in accordance with a designation from the TRILL control unit 33. Furthermore, control frames include frames of, for example, HELLO, LSP (Link State PDU), CSNP (Complete Sequence Number PDU), or PSNP (Partial Sequence Number PDU).

HELLO frames are control frames that are periodically transmitted and received by each of the RBs 3 through a communication port for which broadcast is set and that is used for checking whether the RB 3 is present. A LSP frame is equivalent to a PDU for reporting the distance of a path to the RB 3 to by each of the RBs 3, and it is a control frame that is transmitted to all of the RBs 3 in the TRILL network 1A and that is used for calculating the identical topology information for all of the RBs 3. CSNP frames and PSNP frames are control frames that are used for ensuring the synchronization of link state information.

The TRILL control unit 33 controls various operations of a TRILL protocol. Furthermore, the memory 19 includes a network information DB 71, a statistics information DB 72, a sorting table 73, and an assignment table 74. The network information DB 71 stores network information, such as the adjacency relationship among the RBs 3 or path costs of physical paths. The statistics information DB 72 stores statistics information, such as the used bandwidth of each VLAN and the used bandwidth of each pattern that are described later. The sorting table 73 is the table for sorting group numbers on a per pattern basis as described later. The assignment table 74 is the table that is used for determining an output destination path that is assigned to each group number as described later.

The TRILL control unit 33 includes a state managing unit 41, a protocol control unit 42, and a path determining unit 43. The state managing unit 41 collects the state information, such as the state of each of the RBs 3, e.g., a port state or path costs, through the monitoring control unit 31 and manages the collected state information. When the state managing unit 41 detects a change in the port state due to a failure of a physical path, or the like, via the monitoring control unit 31, it notifies a state change to the protocol control unit 42.

The protocol control unit 42 performs overall control of the TRILL control unit 33. The protocol control unit 42 exchanges a HELLO frame with the different RB 3 via the transmitting and receiving unit 32, thereby autonomously learning the adjacency relationship. The protocol control unit 42 exchanges a control frame, such as LSP, with the different RB 3 via the transmitting and receiving unit 32 to collect the network information, such as the adjacency relationship among the RBs 3 or the path costs of physical paths, and stores the collected network information in the network information DB 71.

The path determining unit 43 determines a physical path that needs to be assigned to each VLAN that is each traffic flow, for example, when it detects a state change due to a failure of a physical path, or the like. The path determining unit 43 includes an assignment processing unit 43A, a port setting unit 43B, and a hardware setting unit 43C. The assignment processing unit 43A determines an output destination path that needs to be assigned to each VLAN from the redundant paths with equal costs among the physical paths. After the output destination path that needs to be assigned to a VLAN is determined, the port setting unit 43B sets a communication port of the output destination path to which the VLAN is assigned. When a VLAN is assigned to the output destination path, the hardware setting unit 43C performs hardware processing on the side of the output destination path, for example, an assignment operation, e.g., various operations for a frame forwarding rule, or the like.

Figures 4, 5:
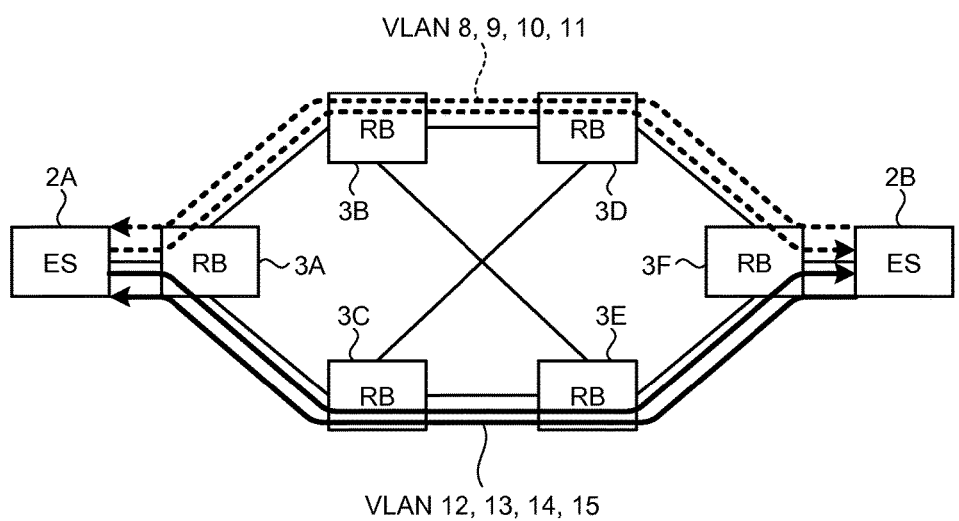
FIG. 4 is an explanatory diagram that illustrates an example of the method for grouping patterns of VLAN IDs.
FIG. 5 is an explanatory diagram that illustrates an example of the operation of the communication system according to the first embodiment.

The assignment processing unit 43A includes a grouping unit 51, a calculating unit 52, a sorting unit 53, a managing unit 54, and a control unit 55. The grouping unit 51 masks the high 9 bit sequence out of the 12 bit sequence that indicates the VLAN ID for identifying a VLAN that is assigned to a physical path in the TRILL network 1A and groups each VLAN by using the pattern of the low 3 bit sequence. FIG. 4 is an explanatory diagram that illustrates an example of the method for grouping the patterns of VLAN IDs. The VLAN ID for identifying a VLAN is made up of a 12 bit sequence. The number of VLANs illustrated in FIG. 4 is 4094. The patterns include eight patterns of the low 3 bit sequence out of the 12 bit sequence of a VLAN ID, for example, "000", "001", "010", "011", "100", "101", "110", and "111". Specifically, the grouping unit 51 groups VLANs into eight patterns by using the low 3 bit sequence out of the 12 bit sequence that indicates a VLAN ID.

The calculating unit 52 refers to the network information by using the ECMP function of the TRILL protocol and calculates the number of redundant paths with equal path costs, i.e., the ECMP number, among the physical paths between the terminal RB 3A and the terminal RB 3F in the TRILL network 1A.

The sorting unit 53 refers to the sorting table 73 for sorting the patterns of the low 3 bit sequence of a VLAN ID into the group numbers that are equivalent to the ECMP number so as to sort the patterns into the group numbers that are equivalent to the ECMP number. The sorting table 73 manages, with respect to each ECMP number, a group number that is sorted into each of the patterns. For example, when the ECMP number is 8, the group numbers are 1 to 8, when the ECMP number is 7, the group numbers are 1 to 7, when the ECMP number is 6, the group numbers are 1 to 6, and when the ECMP number is 5, the group numbers are 1 to 5. Furthermore, when the ECMP number is 4, the group numbers are 1 to 4, when the ECMP number is 3, the group numbers are 1 to 3, when the ECMP number is 2, the group numbers are 1 to 2, and when the ECMP number is 1, the group number is 1. FIG. 6A is an explanatory diagram that illustrates an example of a sorting table 73A (73) of the RB 3 according to the first embodiment. The sorting unit 53 refers to the sorting table 73A to sort the patterns to the group numbers that are equivalent to the ECMP number. The sorting unit 53 sorts them to the group numbers that are equivalent to the ECMP number in ascending order of the patterns, for example, in order from "000", "001", "010", "011", "100", "101", "110", and then "111". The sorting unit 53 sorts each pattern of, for example, "000", "001", "010", and "011" to the group number "1" and each pattern of "100", "101", "110", and "111" to the group number "2". That is, the sorting unit 53 refers to the sorting table 73A and, with respect to each ECMP number, sorts the patterns to the group numbers that are equivalent to the ECMP number.

The managing unit 54 generates the assignment table 74 for relating each of the group numbers to the RBs 3 of an assignable output destination path for a management and manages the assignment table 74. FIG. 6B is an explanatory diagram that illustrates an example of an assignment table 74A (74) of the RB 3 according to the first embodiment. In the operation example of FIG. 6B, it is assumed that the ECMP number is 2, the pattern of the VLAN IDs "8" to "11" is sorted into the group number "1", and the pattern of the VLAN IDs "12" to "15" is sorted into the group number "2". Furthermore, for the convenience of explanation, in the example of FIG. 6B, the RB 3 of the output destination path with respect to each of the RBs 3 is illustrated, and it is assumed that each of the RBs 3 manages only the RB 3 of its own output destination path. However, each of the RBs 3 may manage the RB 3 of the output destination path with respect to all the RBs 3.

The managing unit 54 of the terminal RB 3A manages the assignment table 74A for managing, among the physical paths of the ECMP toward the terminal RB 3F, the relay RB 3B as the output destination path that corresponds to the group number "1" and the relay RB 3C as the output destination path that corresponds to the group number "2".

The managing unit 54 of the relay RB 3B manages the assignment table 74A for managing, among the physical paths of the ECMP toward the terminal RB 3F, the relay RB 3D as the output destination path that corresponds to the group number "1" and the relay RB 3E as the output destination path that corresponds to the group number "2".

The managing unit 54 of the relay RB 3C manages the assignment table 74A for managing, among the physical paths of the ECMP toward the terminal RB 3F, the relay RB 3D as the output destination path that corresponds to the group number "1" and the relay RB 3E as the output destination path that corresponds to the group number "2".

Furthermore, the managing unit 54 of the terminal RB 3F manages the assignment table 74A for managing, among the physical paths of the ECMP toward the terminal RB 3A, the relay RB 3D as the output destination path that corresponds to the group number "1" and the relay RB 3E as the output destination path that corresponds to the group number "2".

The managing unit 54 of the relay RB 3E manages the assignment table 74A for managing, among the physical paths of the ECMP toward the terminal RB 3A, the relay RB 3B as the output destination path that corresponds to the group number "1" and the relay RB 3C as the output destination path that corresponds to the group number "2".

The managing unit 54 of the relay RB 3D manages the assignment table 74A for managing, among the physical paths of the ECMP toward the terminal RB 3A, the relay RB 3B as the output destination path that corresponds to the group number "1" and the relay RB 3C as the output destination path that corresponds to the group number "2".

The control unit 55 refers to the assignment table 74A, determines the output destination path that corresponds to a group number, and collectively assigns, to the output destination path that corresponds to the group number, all the VLANs of all the patterns that correspond to the group number. The control unit 55 of the terminal RB 3A refers to the assignment table 74A and collectively assigns all the VLANs of, for example, the patterns "000", "001", "010", and "011" to "the relay RB 3B" of the output destination path toward the terminal RB 3F. As a result, a single assignment operation is needed to assign, to the output destination path, all the VLANs of, for example, the patterns "000", "001", "010", and "011" that correspond to the group number.

Furthermore, the control unit 55 of the terminal RB 3A refers to the assignment table 74A and collectively assigns all the VLANs of, for example, the patterns "100", "101", "110", and "111" to "the relay RB 3C" of the output destination path toward the terminal RB 3F. As a result, a single assignment operation is needed to assign, to the output destination path, all the VLANs of, for example, the patterns "100", "101", "110", and "111" that correspond to the group number.

In the operation example of the TRILL network 1A that is illustrated in FIG. 5, each of the RBs 3 sequentially assigns all the VLANs "8" to "11" of the patterns "000", "001", "010", and "011" to the redundant path of the terminal RB 3A→the relay RB 3B→the relay RB 3D→the terminal RB 3F. Furthermore, in the TRILL network 1A, each of the RBs 3 sequentially assigns all the VLANs "12" to "15" of the patterns "100", "101", "110", and "111" to the redundant path of the terminal RB 3A→the relay RB 3C→the relay RB 3E→the terminal RB 3F.

In each of the RBs 3 according to the first embodiment, each VLAN is patterned by using the low 3 bit sequence of a VLAN ID, the patterns are sorted into the group numbers that are equivalent to the ECMP number in an ascending order method, and an assignable output destination path of each group number is managed in the assignment table 74A. The RB 3 refers to the assignment table 74A and collectively assigns, to the output destination path that corresponds to a group number, all the VLANs of all the patterns that correspond to the group number. As a result, the operation to assign an output destination path of VLANs is performed on a per group basis and, for example, when the number of groups (the ECMP number) is 8, an assignment operation is needed eight times; therefore, the processing time needed for the assignment operation can be largely reduced. A path distribution control using the ECMP function can be performed in the time that does not depend on the number of VLANs and, for example, a communication down-time due to a failure can be reduced to the minimum.

Furthermore, each of the RBs 3 according to the above-described first embodiment sorts the patterns of VLAN IDs into the group numbers that are equivalent to the ECMP number in an ascending order method; however, sorting may be performed in a round-robin method, and an embodiment of such a case is explained below as a second embodiment. Furthermore, the same components as those of the communication system 1 according to the first embodiment are denoted by the same reference numerals, and explanations of the duplicated configurations and operations are omitted.

[b] Second Embodiment

Figure 7:
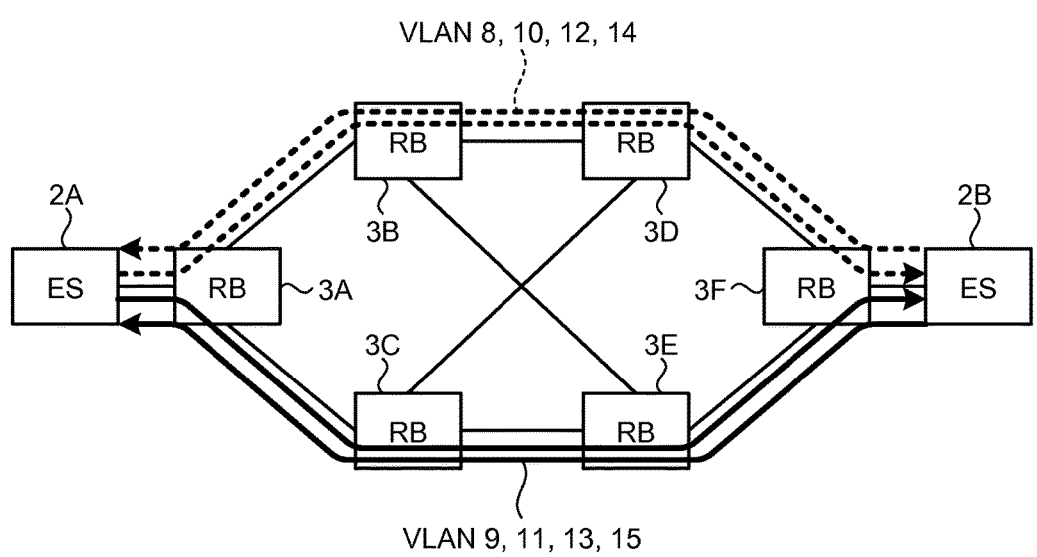
FIG. 7 is an explanatory diagram that illustrates an example of the operation of the communication system according to a second embodiment.

FIG. 7 is an explanatory diagram that illustrates an example of the operation of the communication system 1 according to the second embodiment, FIG. SA is an explanatory diagram that illustrates an example of a sorting table 73B (73) of the RB 3 according to the second embodiment, and FIG. 8B is an explanatory diagram that illustrates an example of an assignment table 74B (74) of the RB 3 according to the second embodiment. The sorting unit 53 refers to the sorting table 73B and sorts the patterns to the group numbers that are equivalent to the ECMP number in a round-robin method in order, for example, from "000", "001", "010", "011", "100", "101", "110", and then "111". In the operation example of FIG. SA, when the ECMP number is 2, the patterns "000", "010", "100", and "110" are sorted into the group number "1", and the patterns "001", "011", "101", and "111" the group number "2".

The managing unit 54 generates the assignment table 74B in which the RBs 3 of an assignable output destination path are related to each of the group numbers and manages the assignment table 74B. In the operation example of FIG. 8B, the ECMP number is 2, the patterns of the VLAN IDs "8", "10", "12", and "14" are sorted into the group number "1", and the patterns of the VLAN IDs "9", "11", "13", and "15" the group number "2" in a round-robin method. Furthermore, for the convenience of explanation, in the operation example of FIG. 8B, the RB 3 of the output destination path with respect to each of the RBs 3 is illustrated, and it is assumed that each of the RBs 3 manages only the RB 3 of its own output destination path. However, each of the RBs 3 may manage the RB 3 of the output destination path with respect to all the RBs 3.

The managing unit 54 of the terminal RB 3A manages the assignment table 74B for managing, among the physical paths of the ECMP toward the terminal RB 3F, the relay RB 3B as the output destination path that corresponds to the group number "1" and the relay RB 3C as the output destination path that corresponds to the group number "2".

The managing unit 54 of the relay RB 3B manages the assignment table 74B for managing, among the physical paths of the ECMP toward the terminal RB 3F, the relay RB 3D as the output destination path that corresponds to the group number "1" and the relay RB 3E as the output destination path that corresponds to the group number "2".

The managing unit 54 of the relay RB 3C manages the assignment table 74B for managing, among the physical paths of the ECMP toward the terminal RB 3F, the relay RB 3D as the output destination path that corresponds to the group number "1" and the relay RB 3E as the output destination path that corresponds to the group number "2".

Furthermore, the managing unit 54 of the terminal RB 3F manages the assignment table 74B for managing, among the physical paths of the ECMP toward the terminal RB 3A, the relay RB 3D as the output destination path that corresponds to the group number "1" and the relay RB 3E as the output destination path that corresponds to the group number "2".

The managing unit 54 of the relay RB 3E manages the assignment table 74B for managing, among the physical paths of the ECMP toward the terminal RB 3A, the relay RB 3B as the output destination path that corresponds to the group number "1" and the relay RB 3C as the output destination path that corresponds to the group number "2".

The managing unit 54 of the relay RB 3D manages the assignment table 74B for managing, among the physical paths of the ECMP toward the terminal RB 3A, the relay RB 3B as the output destination path that corresponds to the group number "1" and the relay RB 3C as the output destination path that corresponds to the group number "2".

The control unit 55 refers to the assignment table 74B, determines the output destination path that corresponds to a group number, and collectively assigns, to the output destination path that corresponds to the group number, all the VLANs of all the patterns that correspond to the group number. The control unit 55 of the terminal RB 3A refers to the assignment table 74B and collectively assigns all the VLANs of, for example, the patterns "000", "010", "100", and "110" to "the relay RB 3B" of the output destination path toward the terminal RB 3F. As a result, a single assignment operation is needed to assign, to the output destination path, all the VLANs of, for example, the patterns "000", "010", "100", and "110" that correspond to the group number.

Furthermore, the control unit 55 of the terminal RB 3A refers to the assignment table 74B and collectively assigns all the VLANs of, for example, the patterns "001", "011", "101", and "111" to "the relay RB 3C" of the output destination path toward the terminal RB 3F. As a result, a single assignment operation is needed to assign, to the output destination path, all the VLANs of, for example, the patterns "001", "011", "101", and "111" that correspond to the group number.

In the operation example of FIG. 7, each of the RBs 3 sequentially assigns all the VLANs "8", "10", "12", and "14" of the patterns "000", "010", "100", and "110" to the redundant path of the terminal RB 3A→the relay RB 3B→the relay RB 3D→the terminal RB 3F. Furthermore, in the operation example of FIG. 7, each of the RBs 3 sequentially assigns all the VLANs "9", "11", "13", and "15" of the patterns "001", "011", "101", and "111" to the redundant path of the terminal RB 3A→the relay RB 3C→the relay RB 3E→the terminal RB 3F.

In each of the RBs 3 according to the second embodiment, each VLAN is patterned by using the low 3 bit sequence of a VLAN ID, the patterns are sorted into the group numbers that are equivalent to the ECMP number in a round-robin method, and an assignable output destination path of each of the group numbers is managed in the assignment table 74B. The RB 3 refers to the assignment table 74B and collectively assigns, to the output destination path that corresponds to a group number, all the VLANs of all the patterns that correspond to the group number. As a result, the operation to assign an output destination path of VLANs is performed on a per group basis and, for example, when the number of groups (the ECMP number) is 8, an assignment operation is needed eight times; therefore, the processing time needed for the assignment operation can be largely reduced. A path distribution control using the ECMP function can be performed in the time that does not depend on the number of VLANs and, for example, a communication down-time due to a failure can be reduced to the minimum.

According to the above-described first embodiment and the above-described second embodiment, all the RBs 3 generate the assignment table 74 by sorting the patterns to the group numbers that are equivalent to the ECMP number by using any one of the ascending-order method and the round-robin method. However, in the operation examples of FIGS. 5 and 7, the physical path between the relay RB 3B and the relay RB 3E and between the relay RB 3C and the relay RB 3D is being unassigned. As a result, communication resources are not effectively used. Therefore, an explanation is given below of, as a third embodiment, an embodiment of the communication system 1 that enables an effective use of communication resources.

[c] Third Embodiment

Figure 9:
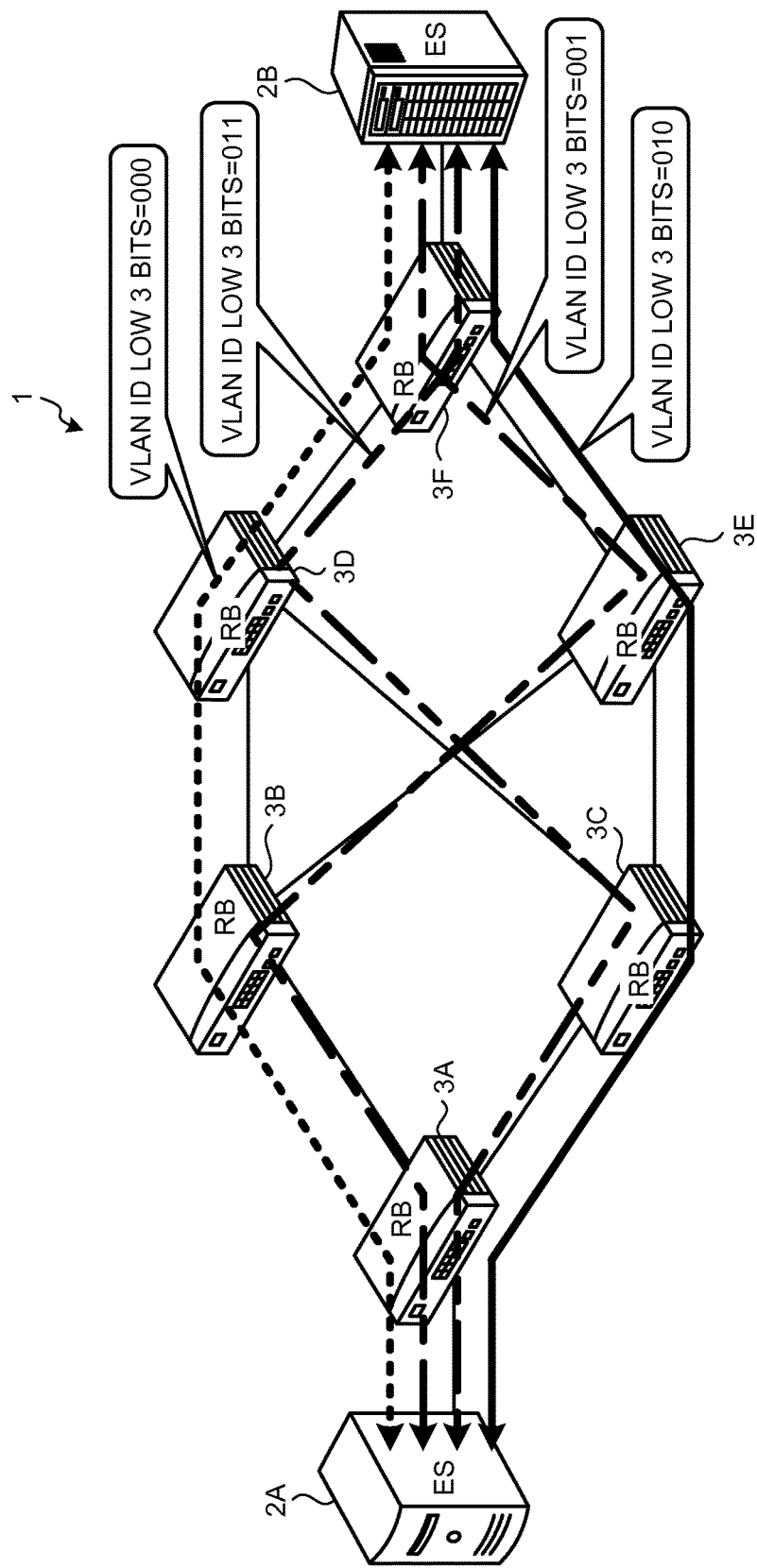
FIG. 9 is an explanatory diagram that illustrates an example of the operation of the communication system according to a third embodiment.

FIG. 9 is an explanatory diagram that illustrates an example of the operation of the communication system 1 according to the third embodiment. Furthermore, the same components as those of the communication system 1 according to the first embodiment and the second embodiment are denoted by the same reference numerals, and explanations of the duplicated configurations and operations are omitted.

In the operation example of FIG. 9, all the VLANs of the pattern "000" are assigned to the physical path of the terminal RB 3A→the relay RB 3B→the relay RB 3D→the terminal RB 3F, and all the VLANs of the pattern "001" are assigned to the physical path of the terminal RB 3A→the relay RB 3B→the relay RB 3E→the terminal RB 3F. Furthermore, in the operation example of FIG. 9, all the VLANs of the pattern "011" are assigned to the physical path of the terminal RB 3A→the relay RB 3C→the relay RB 3D→the terminal RB 3F, and all the VLANs of the pattern "010" are assigned to the physical path of the terminal RB 3A→the relay RB 3C→the relay RB 3E→the terminal RB 3F.

Figure 10:
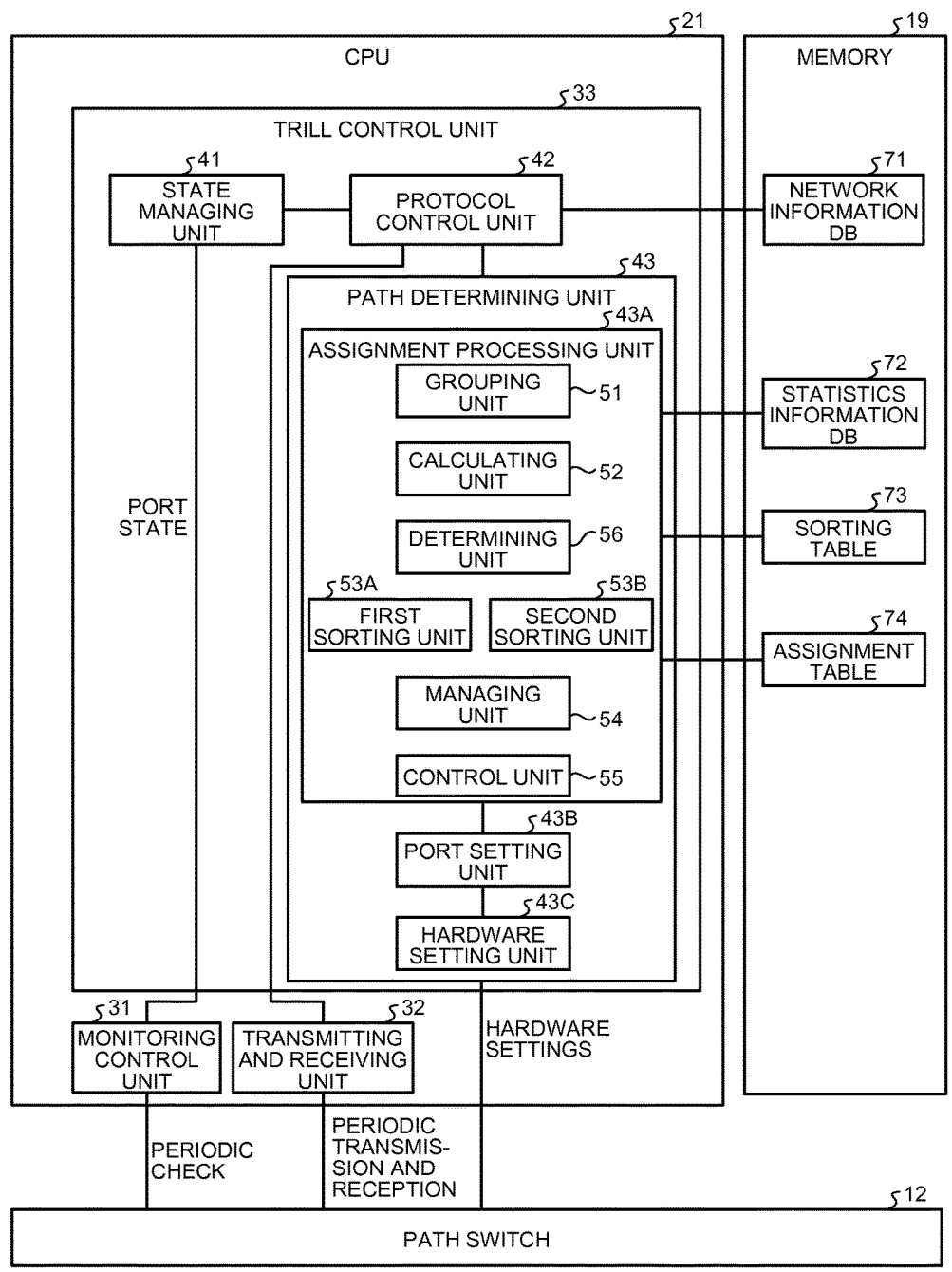
FIG. 10 is a block diagram that illustrates an example of the functional configuration of the CPU of the RB according to the third embodiment.

FIG. 10 is a block diagram that illustrates an example of the functional configuration of the CPU 21 of the RB 3 according to the third embodiment. The assignment processing unit 43A illustrated in FIG. 10 includes a determining unit 56, a first sorting unit 53A, and a second sorting unit 53B in addition to the grouping unit 51, the calculating unit 52, the managing unit 54, and the control unit 55. Furthermore, the calculating unit 52 of the terminal RBs 3A and 3F corresponds to a first calculating unit, the managing unit 54 a first managing unit, and the control unit 55 a first control unit. The calculating unit 52 of the relay RBs 3B, 3C, 3D, and 3E corresponds to a second calculating unit, the managing unit 54 a second managing unit, and the control unit 55 a second control unit.

The determining unit 56 of the RB 3 determines whether the RB 3 is the terminal RB 3. FIG. 11A is an explanatory diagram that illustrates an example of the sorting table 73A on the side of the terminal RB 3. When the RB 3 is the terminal RB 3, the first sorting unit 53A refers to the sorting table 73A with the ascending-order method that is illustrated in FIG. 11A and sorts the patterns into the group numbers that are equivalent to the ECMP number. FIG. 11B is an explanatory diagram that illustrates an example of the assignment table 74A on the side of the terminal RB 3.

The managing unit 54 of each of the terminal RBs 3 generates the assignment table 74A in which the RB 3 of an assignable output destination path is related to each of the group numbers for a management and manages the assignment table 74A. FIG. 11B is an explanatory diagram that illustrates an example of the assignment table. Furthermore, the assignment table 74A illustrated in FIG. 11B is the assignment table 74A of the terminal RB 3A.

The control unit 55 of each of the terminal RBs 3 refers to the assignment table 74A, determines the output destination path that corresponds to a group number, and collectively assigns, to the output destination path that corresponds to the group number, all the VLANs of all the patterns that correspond to the group number.

FIG. 12A is an explanatory diagram that illustrates an example of the sorting table 73B on the side of the relay RB 3. The second sorting unit 53B of the RB 3 refers to the sorting table 73B that is illustrated in FIG. 12A and that is in a round-robin method and sorts the patterns into the group numbers that correspond to the ECMP number, when the RB 3 is not the terminal RB 3 but the RB 3 is the relay RB 3. FIG. 12B is an explanatory diagram that illustrates an example of the assignment table 74B on the side of the relay RB 3. Furthermore, the assignment table 74B illustrated in FIG. 12B is the assignment table 74B of the relay RB 3B.

The managing unit 54 of each of the relay RBs 3 generates the assignment table 74B in which the RB 3 of an assignable output destination path is related to each group number for a management and manages the assignment table 74B. The control unit 55 of each of the relay RBs 3 refers to the assignment table 74B, determines the output destination path that corresponds to a group number, and collectively assigns, to the output destination path that corresponds to the group number, all the VLANs of all the patterns that correspond to the group number.

Each of the terminal RBs 3 refers to the assignment table 74A that uses the sorting table 73A with the ascending-order method, and each of the relay RBs 3 refers to the assignment table 74B that uses the sorting table 73B with the round-robin method, thereby performing the assignment operation. As a result, VLANs can be assigned to the physical path between the relay RB 3B and the relay RB 3E in the TRILL network 1A and between the relay RB 3C and the relay RB 3D; therefore, communication resources can be effectively used.

FIG. 13 is an explanatory diagram that illustrates an example of the comparison result of the processing times with regard to an assignment operation according to the third embodiment and a comparative example. When the time taken for the equivalent of one-time software processing during an assignment operation is 2 ms, and when the time taken for the equivalent of one-time hardware processing during an assignment operation is 20 ms, the total processing time that is the equivalent of a one-time assignment operation is 22 ms.

In the comparative example illustrated in FIG. 13, the processing time for software processing and the processing time for an assignment operation that is needed for hardware processing are increased in proportion to an increase in the number of VLANs. For example, when the number of VLANs is 4096, the processing time for an assignment operation is 22 ms×4096=90112 ms.

Conversely, according to the third embodiment, in a case where the ECMP number is 1, even when the number of VLANs is 4096, the processing time of an one-time assignment operation, i.e., 22 ms, is needed. Furthermore, according to the third embodiment, in a case where the ECMP number is 2, even when the number of VLANs is 4096, the processing time (22 ms to 44 ms) of an assignment operation for 2 groups, i.e., two times is needed.

Furthermore, in a case where the ECMP number is 4 according to the third embodiment, even when the number of VLANs is 4096, the processing time (22 ms to 88 ms) of an assignment operation for 4 groups, i.e., four times is needed. Moreover, in a case where the ECMP number is 8 according to the third embodiment, even when the number of VLANs is 4096, the processing time (22 ms to 176 ms) of an assignment operation for 8 groups, i.e., eight times is needed.

Specifically, according to the third embodiment, even when the number of VLANs is large, the processing time related to an assignment operation becomes shorter compared to the comparative example; therefore, as the number of VLANs is increased, much advantage is produced.

Furthermore, in the case that is illustrated according to the above-described first embodiment to the above-described third embodiment, when the ECMP number is 2, 2 groups are obtained, and an assignment operation for VLANs is needed twice in the overall communication system 1; however, for example, when the ECMP number is 3, 3 groups are obtained, and an assignment operation for VLANs is needed three times in the overall communication system 1. Specifically, when the groups that are equivalent to the ECMP number are obtained, assignment operations for VLANs in the overall communication system 1 are grouped into the ECMP number at a maximum, and the number of times the assignment operations for VLANs are needed in the overall communication system 1 is the ECMP number.

According to the above-described first embodiment to the above-described third embodiment, all the VLANs of all the patterns of a group number are collectively assigned and set to the output destination path that corresponds to the group number; thus, a constant load distribution effect of traffic flows can be obtained. However, according to the above-described first embodiment to the above-described third embodiment, the load (used band) of each VLAN is not considered; therefore, unevenness occurs in some physical paths in accordance with the ID value of a used VLAN or the used band of each VLAN, and there is a possibility of the occurrence of congestion.

Here, an explanation is given below of, as a fourth embodiment, an embodiment of the RB 3 that has the function to distribute the used band (load) of each VLAN to prevent unevenness of the loads on some physical paths. Furthermore, the same components as those of the communication system 1 according to the third embodiment are denoted by the same reference numerals, and explanations of the duplicated configurations and operations are omitted.

[d] Fourth Embodiment

Figure 14:
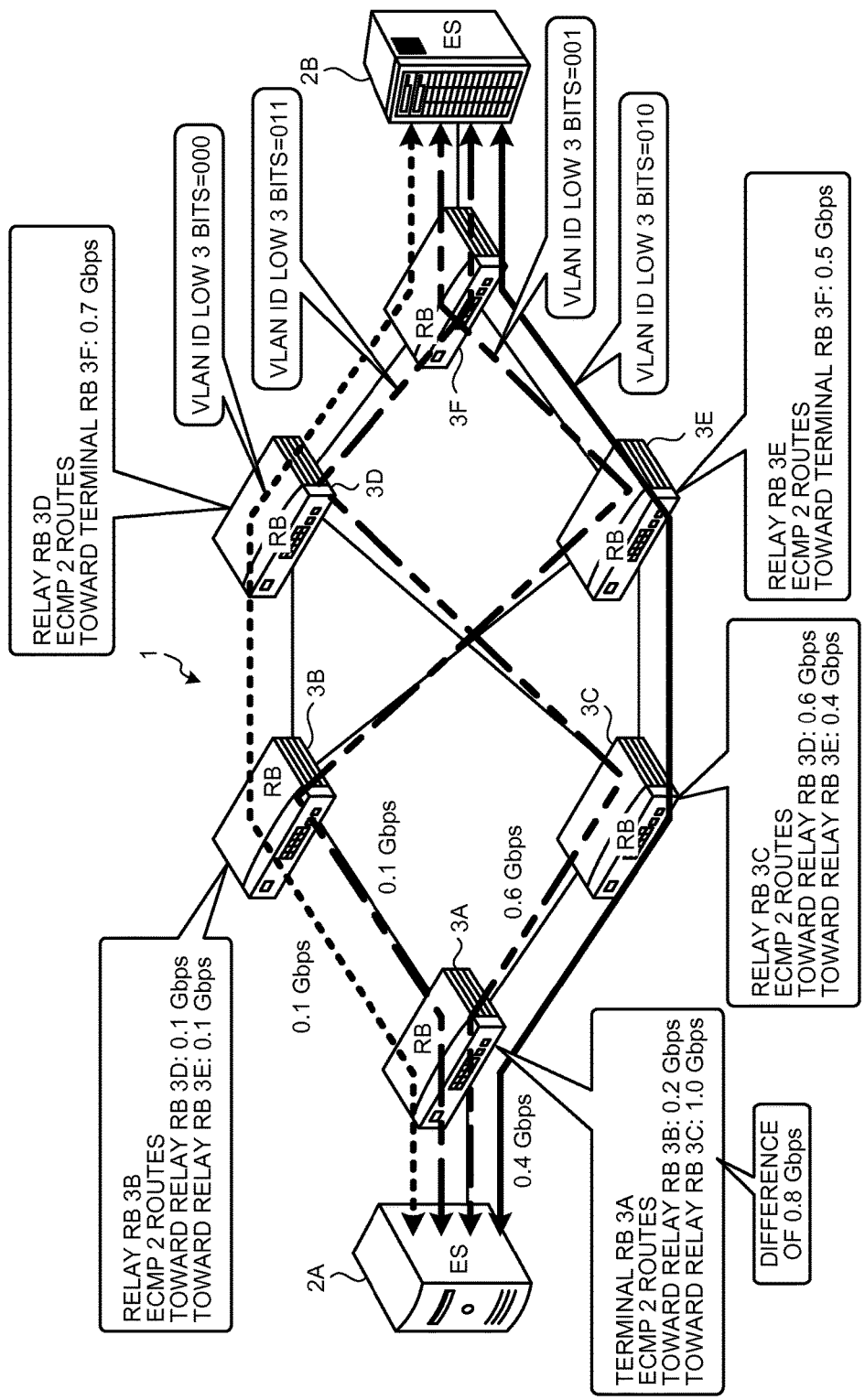
FIG. 14 is an explanatory diagram that illustrates an example of the operation of the communication system before load distribution is performed according to a fourth embodiment.

FIG. 14 is an explanatory diagram that illustrates an example of the operation of the communication system 1 before load distribution is performed according to the fourth embodiment. In the operation example of the TRILL network 1A illustrated in FIG. 14, it is assumed that the VLANs "8" and "24" that correspond to the pattern "000" are assigned to the physical path of the terminal RB 3A→the relay RB 3B→the relay RB 3D→the terminal RB 3F. Furthermore, in the operation example of the TRILL network 1A, it is assumed that the VLANs "9" and "25" that correspond to the pattern "001" are assigned to the physical path of the terminal RB 3A→the relay RB 3B→the relay RB 3E→the terminal RB 3F. Furthermore, in the operation example of the TRILL network 1A, it is assumed that the VLANs "10" and "26" that correspond to the pattern "010" are assigned to the physical path of the terminal RB 3A→the relay RB 3C→the relay RB 3E→the terminal RB 3F. Moreover, in the operation example of the TRILL network 1A, it is assumed that the VLANs "11" and "27" that correspond to the pattern "011" are assigned to the physical path of the terminal RB 3A→the relay RB 3C→the relay RB 3D→the terminal RB 3F.

Figure 15:
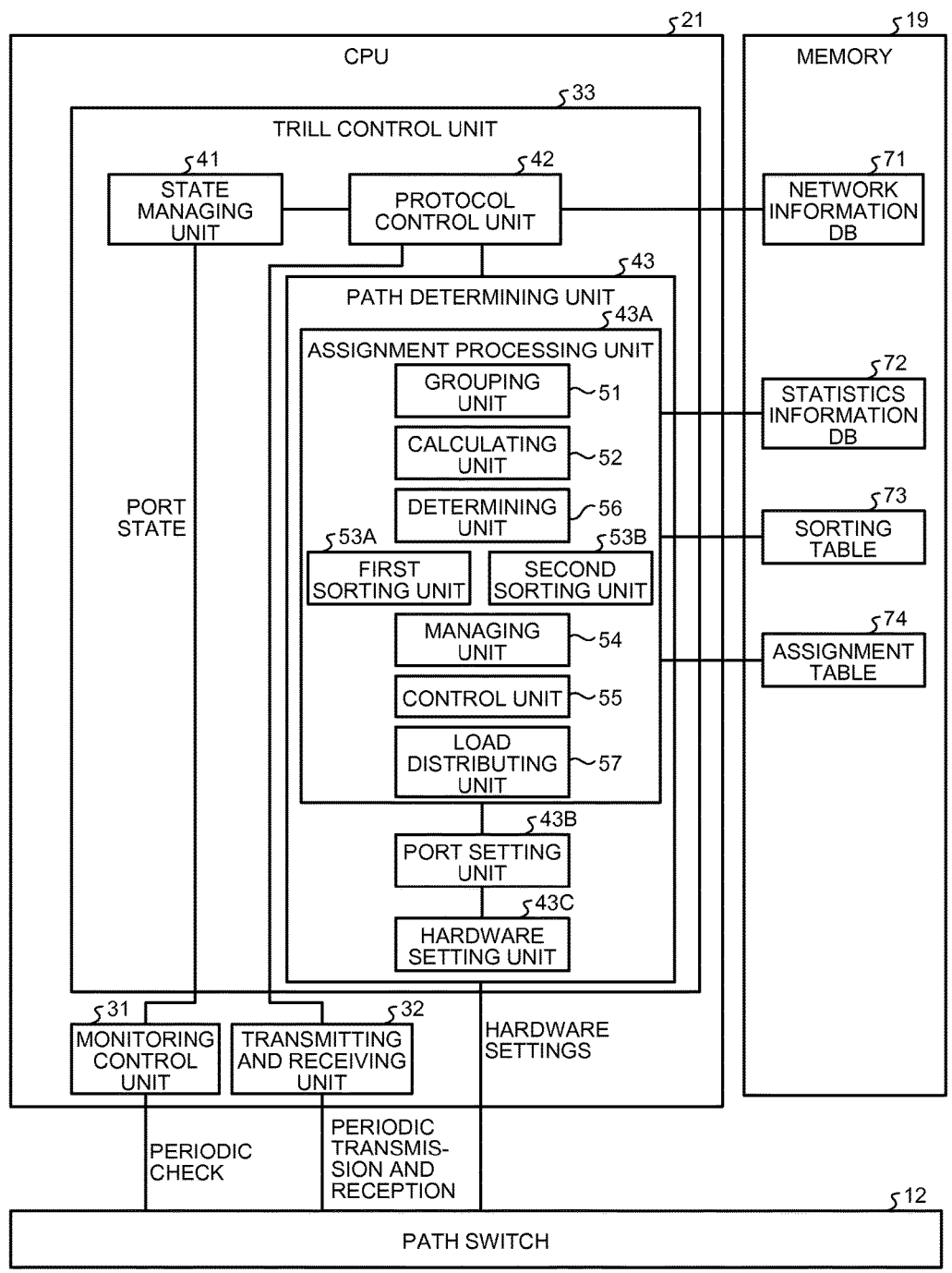
FIG. 15 is a block diagram that illustrates an example of the functional configuration of the CPU of the RB according to the fourth embodiment.

FIG. 15 is a block diagram that illustrates an example of the functional configuration of the CPU 21 of the RB 3 according to the fourth embodiment. The assignment processing unit 43A illustrated in FIG. 15 includes a load distributing unit 57 in addition to the grouping unit 51, the calculating unit 52, the first sorting unit 53A, the second sorting unit 53B, the managing unit 54, the control unit 55, and the determining unit 56. The load distributing unit 57 collects, from the statistics information DB 72, the used band (load) of each VLAN and the used band of each physical path.

FIG. 16 is an explanatory diagram that illustrates an example of the method for adding up the used bands on a per pattern basis. The load distributing unit 57 collects the used band of each VLAN, adds up the used bands of the VLANs with the same pattern, and calculates the used band of each pattern. In the operation example of FIG. 16, it is assumed that the used band of the pattern "000" of the VLANs "8" and "24" is 0.1 Gbps and the used band of the pattern "001" of the VLANs "9" and "25" is 0.1 Gbps. Furthermore, in the operation example, it is assumed that the used band of the pattern "010" of the VLANs "10" and "26" is 0.4 Gbps and the used band of the pattern "011" of the VLANs "11" and "27" is 0.6 Gbps.

When attention is focused on the terminal RB 3A of FIG. 14, the load distributing unit 57 determines that the used band of the physical path between the terminal RB 3A and the relay RB 3B is 0.2 Gbps as all the VLANs of "000" and "001" are assigned to the relay RB 3B as the output destination path toward the terminal RB 3F.

Furthermore, the load distributing unit 57 of the terminal RB 3A determines that the used band of the physical path between the terminal RB 3A and the relay RB 3C is 1.0 Gbps as all the VLANs of "010" and "011" are assigned to the relay RB 3C as the output destination path toward the terminal RB 3F. Specifically, the load distributing unit 57 of the terminal RB 3A determines the unevenness of loads on the redundant paths as the used band of the physical path between the terminal RB 3A and the relay RB 3B is 0.2 Gbps and the used band of the physical path between the terminal RB 3A and the relay RB 3C is 1.0 Gbps.

After the load distributing unit 57 of the terminal RB 3A determines the unevenness of loads on the redundant paths, it determines the pattern with the maximum used band among the patterns so as to evenly distribute the used band of each physical path. Furthermore, the load distributing unit 57 of the terminal RB 3A determines the redundant path with the maximum available band among the assignable redundant paths. Then, the load distributing unit 57 assigns all the VLANs of the pattern with the maximum used band to the redundant path with the maximum available band. Furthermore, the load distributing unit 57 determines the pattern with the maximum used band among the remaining patterns and determines the redundant path with the maximum available band among the assignable redundant paths. Then, the load distributing unit 57 sequentially assigns all the VLANs of the pattern with the maximum used band to the redundant path with the maximum available band.

The load distributing unit 57 assigns all the VLANs of the pattern "011" with the maximum used band (0.6 Gbps) to the redundant path (the terminal RB 3A-the relay RB 3B) with the maximum available band. Next, the load distributing unit 57 assigns all the VLANs of the pattern "010" with the maximum used band (0.4 Gbps) after "011" to the redundant path (the terminal RB 3A-the relay RB 3C) with the maximum available band among the assignable redundant paths. Next, the load distributing unit 57 assigns all the VLANs of the pattern "000" with the maximum used band (0.1 Gbps) after "010" to the redundant path (the terminal RB 3A-the relay RB 3C) with the maximum available band among the assignable redundant paths. Next, the load distributing unit 57 assigns all the VLANs of the pattern "001" with the maximum or equivalent used band (0.1 Gbps) after "000" to the redundant path (the terminal RB 3A-the relay RB 3C) with the maximum available band among the assignable redundant paths.

Next, the load distributing unit 57 of the relay RB 3B assigns all the VLANs of "011" to the assignable redundant path (the relay RB 3B-the relay RB 3D), as there is the single pattern "011" to be assigned.

Furthermore, the load distributing unit 57 of the relay RB 3C assigns all the VLANs of the pattern "010" with the maximum used band (0.4 Gbps) to the redundant path (the relay RB 3C-the relay RB 3E) with the maximum available band among the assignable redundant path. Next, the load distributing unit 57 assigns all the VLANs of the pattern "000" with the maximum used band (0.1 Gbps) after "010" to the redundant path (the relay RB 3C-the relay RB 3D) with the maximum available band among the assignable redundant paths. Next, the load distributing unit 57 assigns all the VLANs of the pattern "001" with the maximum or equivalent used band (0.1 Gbps) after "000" to the redundant path (the relay RB 3C-the relay RB 3D) with the maximum available band among the assignable redundant paths.

Figure 17:
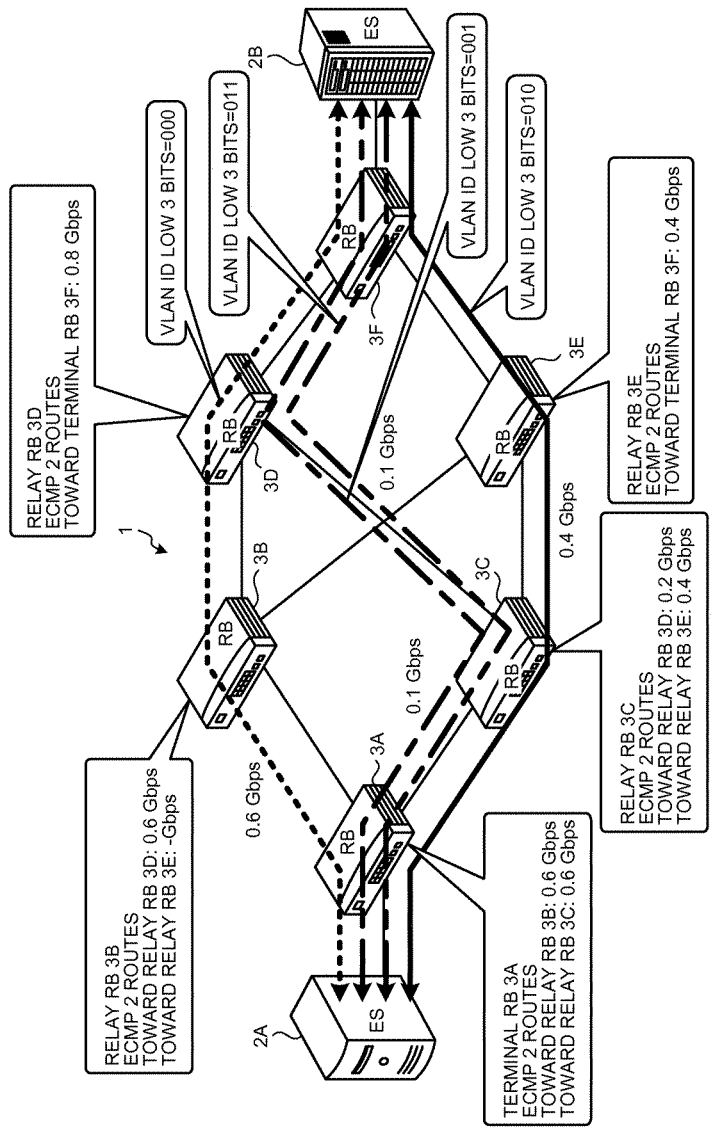
FIG. 17 is an explanatory diagram that illustrates an example of the operation of the communication system after load distribution is performed according to the fourth embodiment.

Specifically, after VLANs are assigned to redundant paths on a per group basis, the load distributing unit 57 of each of the RBs 3 distributes the used bands of the VLANs to redundant paths on a per pattern basis. As a result, for example, as illustrated in FIG. 17, distribution is performed such that the used band of the physical path between the terminal RB 3A and the relay RB 3B is 0.6 Gbps and the used band of the physical path between the terminal RB 3A and the relay RB 3C is 0.6 Gbps; thus, unevenness of the loads on redundant paths is prevented, while the occurrence of congestion is prevented.

After each of the RBs 3 according to the fourth embodiment assigns VLANs to redundant paths on a per group basis, it distributes the used bands of the VLANs to the redundant paths on a per pattern basis. As a result, while unevenness of the loads on redundant paths is prevented, the occurrence of congestion can be prevented.

Furthermore, according to the above-described fourth embodiment, the used band of each VLAN is increased or decreased due to various factors, such as a period of time; therefore, the start-up timing of the load distributing unit 57 may be, for example, a timing at which a start-up operation of a user is detected, a timing at which congestion is detected, or a timing at which it is detected that a specific period of time is reached, or the like.

According to the above-described fourth embodiment, after VLANs are assigned to redundant paths on a per group basis, a load distribution operation is performed to distribute the used bands of the VLANs to redundant paths on a per pattern basis. However, after an assignable redundant path (output destination path) is determined on a per group basis, and before VLANs are assigned to the output destination path, a load distribution operation may be performed on a per pattern basis.

Furthermore, according to the above-described first embodiment to the above-described fourth embodiment, VLANs are automatically assigned to redundant paths on a per group basis; however, a specific VLAN in which loads are concentrated may be removed from the targets for an automatic assignment in accordance with a user's designation operation so that the specific VLAN is assigned to an arbitrary available physical path. Therefore, it is possible to perform intended path switching due to a construction that takes place during an operation, or the like.

The grouping unit 51 according to the above-described first embodiment to the above-described fourth embodiment groups VLANs into eight patterns by using the low 3 bit sequence of VLAN IDs. However, sorting may be performed by using, out of the bit sequence of a VLAN ID, a specific bit sequence, e.g., the high 3 bit sequence (see FIG. 18A) or a bit sequence (see FIG. 18B) that is made up of bit values of predetermined orders.

Furthermore, the grouping unit 51 groups VLANs into the eight patterns by using the low 3 bit sequence out of the bit sequence of a VLAN ID; however, the number of bits may be changed, and VLANs may be grouped into 16 patterns by using, for example, the low 4 bit sequence.

Furthermore, the RB 3 according to the above-described embodiments collectively assigns, on a per group basis, all the VLANs of all the patterns of a corresponding group number to the output destination path (redundant path) that corresponds to the group number. However, without patterning VLANs, VLANs may be sorted into the group numbers that are equivalent to the ECMP number, and all the VLANs of the group number may be collectively assigned to the output destination path of the group number.

Furthermore, components of each unit illustrated do not necessarily need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads or usage.

Furthermore, all or any of various processing functions performed by each device may be implemented by a CPU (Central Processing Unit) (or a microcomputer such as an MPU (Micro Processing Unit) or MCU (Micro Controller Unit)). Moreover, it is self-evident that all or any of the various processing functions may be implemented by programs analyzed and executed by a CPU (or a microcomputer such as an MPU or MCU) or by wired logic hardware.

According to an aspect, the number of times an assignment operation is performed when traffic flows are assigned to paths is reduced so that the processing time can be shortened.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   a processor coupling to a memory, wherein the processor executes a process comprising
      grouping traffic flows into patterns, each of the patterns being made up of multiple bit values of predetermined orders out of a bit sequence of identification information for identifying the traffic flows;
      calculating a number of redundant paths with an equal cost among physical paths in a communication network with a layer-2 redundancy protocol;
      sorting multiple traffic flows into groups according to a predetermined order, a number of the groups being equivalent to a number of redundant paths, the traffic flows being to be assigned to the physical paths;
      sorting the patterns into the groups that are equivalent to the number of redundant paths according to the predetermined order;
      referring to a managing unit that manages, with respect to each of the groups, an assignable output destination path among the physical paths;
      first determining the output destination path for each of the groups; and
      collectively assigning all traffic flows of all patterns of a group to the output destination path of the group.

2. The communication device according to claim 1, wherein the sorting sorts the patterns into the groups according to the predetermined order of the patterns, the predetermined order being determined by using an ascending order method with respect to a predetermined bit sequence that is made up of multiple bit values of predetermined orders out of a bit sequence of identification information for identifying the traffic flows.

3. The communication device according to claim 1, wherein the sorting sorts the patterns into the groups according to the predetermined order of the patterns, the predetermined order being determined by using a round-robin method.

4. The communication device according to claim 1, the process further comprising second determining whether the communication device is a terminal device that is located at a terminal of the communication network, wherein
   when the second determining determines that the communication device is the terminal device, the sorting sorts the patterns into the groups according to the predetermined order that is obtained by determining an order of the patterns by using an ascending order method with respect to a predetermined bit sequence that is made up of multiple bit values of predetermined orders out of a bit sequence of identification information for identifying the traffic flows.

5. The communication device according to claim 1, the process further comprising third determining whether the communication device is a relay device other than a terminal device that is located at a terminal of the communication network, wherein
   when the third determining determines that the communication device is the relay device, the sorting sorts the patterns into the groups according to the predetermined order that is obtained by determining an order of the patterns by using a round-robin method.

6. The communication device according to claim 1, the process further comprising:
   collecting a used band of each of the traffic flows and a used band of each of the patterns and collecting an available band of each of the physical paths; and
   using, after the first determining determines an output destination path of each of the traffic flows in units of the group, the used band of each of the patterns and the available band of each of the physical paths to redetermine an output destination path of each of the traffic flows such that loads of the used band of each of the patterns are distributed to the available band of each of the physical paths and that assigns a traffic flow to the redetermined output destination path.

7. The communication device according to claim 1, the process further comprising designating an arbitrary traffic flow out of the traffic flows, wherein
   the assigning assigns the arbitrary traffic flow that is designated at the designating to an arbitrary assignable output destination path among the physical paths.

8. A communication system comprising:
   a terminal device that is located at a terminal of a communication network of a layer-2 redundancy protocol; and
   a relay device other than the terminal device in the communication network, wherein
   the terminal device comprises a first processor, wherein the first processor executes a first process comprising:
      first grouping traffic flows into patterns, each of the patterns being made up of multiple bit values of predetermined orders out of a bit sequence of identification information for identifying the traffic flows;
      first calculating a number of redundant paths with an equal cost among physical paths in the communication network;
      first sorting multiple traffic flows into groups that are equivalent to the number of redundant paths according to an order that is determined by using an ascending order method, the traffic flows being to be assigned to the physical paths;
      second sorting the patterns into the groups that are equivalent to the number of redundant paths according to the predetermined order;
      first referring to a first managing unit that manages, with respect to each of the groups, an assignable output destination path among the physical paths;
      first determining the output destination path for each of the groups; and
      collectively second assigning all traffic flows of all patterns of a group to the output destination path of the group, and
   the relay device comprises a second processor, wherein the second processor executes a second process comprising:
      second grouping traffic flows into patterns;
      second calculating the number of redundant paths;
      third sorting the traffic flows into groups that are equivalent to the number of redundant paths according to an order that is determined by using a round-robin method;
      fourth sorting the patterns into the groups that are equivalent to the number of redundant paths according to the predetermined order;

second referring to a second managing unit that manages, with respect to each of the groups, an assignable output destination path among the physical paths;

second determining the output destination path for each of the groups; and collectively fourth assigning all traffic flows of all patterns of a group to the output destination path of the group.

9. A communication method that is performed by a communication device, the communication method comprising:

grouping, using a processor, traffic flows into patterns, each of the patterns being made up of multiple bit values of predetermined orders out of a bit sequence of identification information for identifying the traffic flows;

calculating, using the processor, a number of redundant paths with an equal cost among physical paths in a communication network with a layer-2 redundancy protocol;

sorting, using the processor, multiple traffic flows into groups that are equivalent to the number of redundant paths according to a predetermined order, the traffic flows being to be assigned to the physical paths;

sorting, using the processor, the patterns into the groups that are equivalent to the number of redundant paths according to the predetermined order;

referring, using the processor, to a managing unit that manages, with respect to each of the groups, an assignable output destination path among the physical paths;

determining, using the processor, the output destination path for each of the groups; and collectively assigning, using the processor, all traffic flows of all patterns of a group to the output destination path of the group.

* * * * *